United States Patent [19]

Eberle

[11] Patent Number: 4,993,566
[45] Date of Patent: Feb. 19, 1991

[54] SPIRAL CONTAINER BASE STRUCTURE FOR HOT FILL PET CONTAINER

[75] Inventor: Theodore F. Eberle, Saline, Mich.

[73] Assignee: Hoover Universal, Inc., Plymouth, Mich.

[21] Appl. No.: 452,638

[22] Filed: Dec. 19, 1989

[51] Int. Cl.⁵ .................... B65D 1/02; B65D 1/42; B65D 23/00
[52] U.S. Cl. .................... 215/1 C; 220/606; 220/608
[58] Field of Search ............ 215/1 C; 220/66, 69, 220/70, 72, 604–606, 608, 609

[56] References Cited

U.S. PATENT DOCUMENTS

| | | | |
|---|---|---|---|
| 4,134,510 | 1/1979 | Chang | 220/72 X |
| 4,174,782 | 11/1979 | Obsomer | 215/1 C |
| 4,249,666 | 2/1981 | Hubert et al. | 220/70 X |
| 4,598,831 | 7/1986 | Nakamura et al. | 215/1 C |
| 4,863,046 | 9/1989 | Collette et al. | 220/72 X |
| 4,877,141 | 10/1989 | Hayashi | 215/1 C |

FOREIGN PATENT DOCUMENTS

| | | | |
|---|---|---|---|
| 61-144012 | 9/1986 | Japan | |
| 62-28335 | 2/1987 | Japan | |
| 2235041 | 10/1987 | Japan | 215/1 C |

Primary Examiner—Sue A. Weaver
Attorney, Agent, or Firm—Harness, Dickey & Pierce

[57] ABSTRACT

An improved base configuration for a plastic container used in hot-fill applications. The base is concentric with the side walls of the container and an outer ring of the base is connected to a central dome portion which extends upwardly into the body cavity of the container and terminates in a central disk region, which is also generally concentric with the side walls of the container. Radiating in a substantially spiral fashion, from the central disk downward along the dome to the outer ring, are a number of reinforcement ribs and slides which increases the amount of material in the base which is sufficiently oriented and able to resist the deformation induced by unrelaxed retractive stresses during filling of the container with a liquid of elevated temperature.

4 Claims, 2 Drawing Sheets

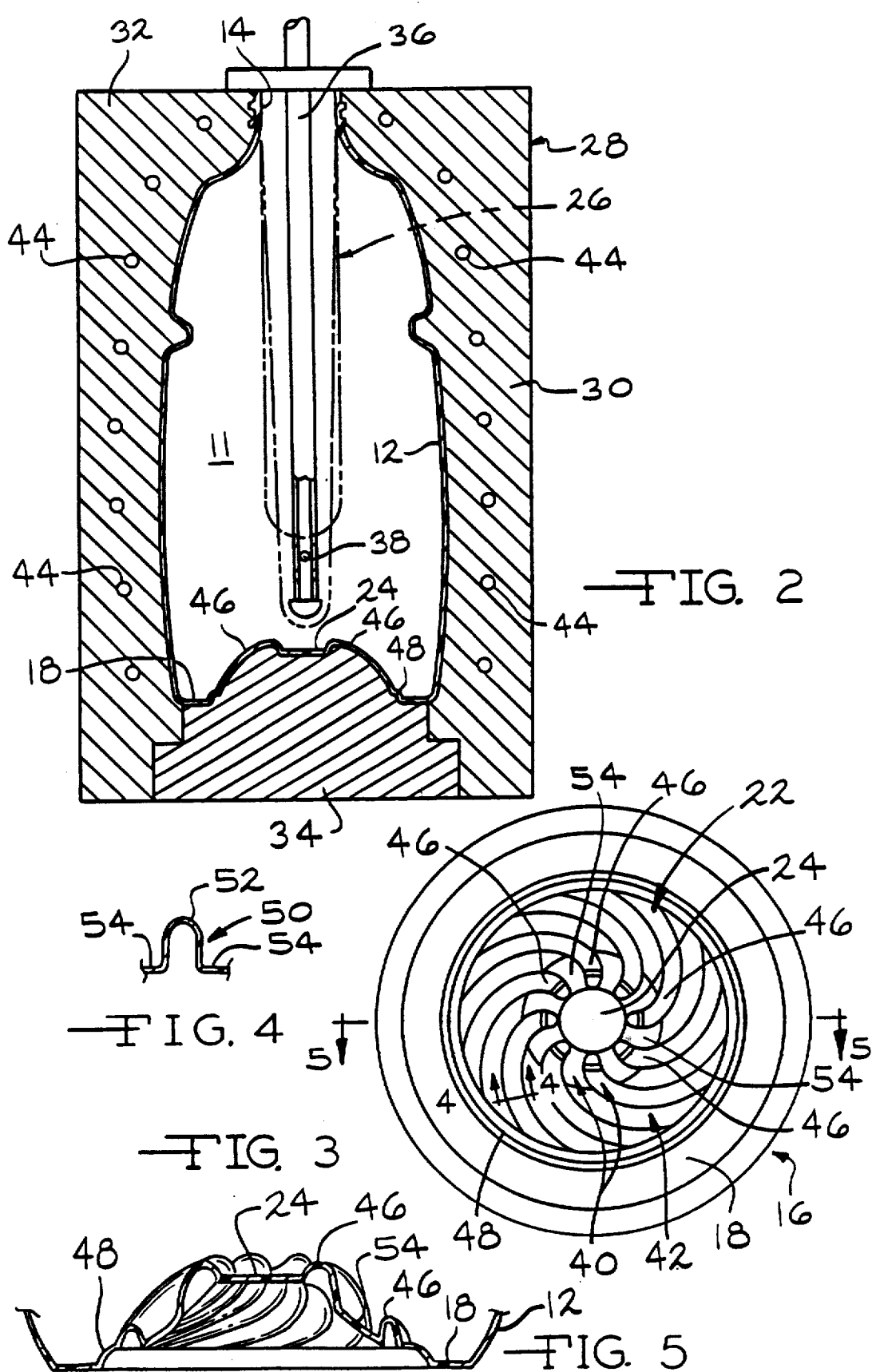

SPIRAL CONTAINER BASE STRUCTURE FOR HOT FILL PET CONTAINER

BACKGROUND AND SUMMARY OF THE INVENTION

This invention relates generally to polyester containers and more particularly to a polyester container formed of polyethelene terephthalate (PET) and provided with an improved base configuration enabling the container to be filled with hot liquid without deformation.

Typical PET containers are formed by a process in which an elongated tubular preform, made by injection molding or other process, is heated and expanded into conformity with the inside surface of a mold cavity, thus producing a semi-rigid thin-walled container. Since the container is exposed to various pressures and forces during production and use, as will better be explained below, it must be designed to respond to such physical influences while maintaining the predetermined and desired configuration. Random or asymmetrical buckling and deformation of the container produce an aesthetically and commercially unacceptable product and therefore, must be avoided.

During the process of making a blow molded PET container, the preform is typically stretched and inflated so as to impart both axial and radial elongation in the material. In the art, such forming is known as biaxial elongation. The biaxial elongation imparts retractive stresses within the material which, if not relaxed or physically restrained, tend to cause the article to shrink and deform in the directions of the previous elongation.

The influence of such unrelaxed retractive stresses is particularly significant during certain stages of the production process. The first occurs immediately after demolding the container. At this stage, the elevated temperature of the container material results in an article which is significantly less rigid than the final product. Predictably, the retractive stresses tend to have a greater influence during this phase of the production process where the "memory" of the PET tends to cause the container to attempt a return to its original preform shape.

Another phase of the production process where retractive stresses are significant occurs in the case of a so-called "hot-fill" container, where a beverage or product at an elevated temperature is deposited in the container. The elevated temperature of the beverage imposes additional mechanical stresses on the container structure. Immediately after a hot liquid is dispensed into the container, the liquid's temperature decreases the rigidity of the PET material and again, the container is susceptible to the effects of the unrelaxed retractive stresses.

Beyond the production process, the container must also be structured so that it will sustain internal pressure changes while maintaining its desired configuration. For example, as a hot-filled liquid cools, it shrinks in volume resulting a negative pressure being produced within the container. During use, the container must be resistant to deformation caused by a sudden increase in internal pressure as can occur when the container is handled or dropped.

It is known within the industry that the PET in the bottom wall of the container will not be molecularly consistent, with regard to molecular orientation, throughout a cross-section of the base. Rather, the bottom wall will consist of an amorphous region in the center of the base, where the PET is significantly thick and not stretched or biaxially oriented by the blowing process, and a uniformly oriented region, where the PET is stretched and biaxially oriented, adjacent to the peripheral edge connecting the base to the side wall of the container. Both of the above mentioned regions are resistant to the retractive stresses; the center amorphous region due to its increased thickness and the uniformly oriented region because of its biaxial orientation. However, between the amorphous and uniform regions there exists a transition or neck region that is not significantly thick or uniformly oriented, and therefore, not resistive to the retractive stresses.

U.S. Pat. No. 4,598,831, issued to Nakamura, discloses a method of reshaping and orienting a portion of the transition region in the base to form a radial array of triangular pyramid sections, the bottom surface of which is sufficiently stretched and oriented. However, in the above mentioned patent a significant amount of the transition region remains transitional, and therefore unoriented and non-resistive to the retractive stresses.

In accordance with the present invention, a PET container is provided having a base structure of an improved configuration which maintains structural rigidity and resistance against random deformation and shrinkage in response to the previously described mechanical and thermal stresses. This is accomplished by providing spiral array of reinforcing embossments, ribs or other structural interruptions in the region spanning the transitional area of the base between the amorphous PET and the uniformly oriented portions of the base.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 2 is a cross-sectional view through a blow molding cavity showing a container provided with the improved base structure of this invention and also showing in phantom lines, the axial stretching of the preform from which the container is formed;

FIG. 3 is a bottom view of the container base structure of this invention;

FIG. 4 is a fragmentary enlarged sectional view of a portion of the base structure taken generally along line 4—4 in FIG. 3; and FIG. 5 is a cross-sectional view substantially taken along line 5—5 in FIG. 3

DETAILED DESCRIPTION OF THE INVENTION

Figure 1:
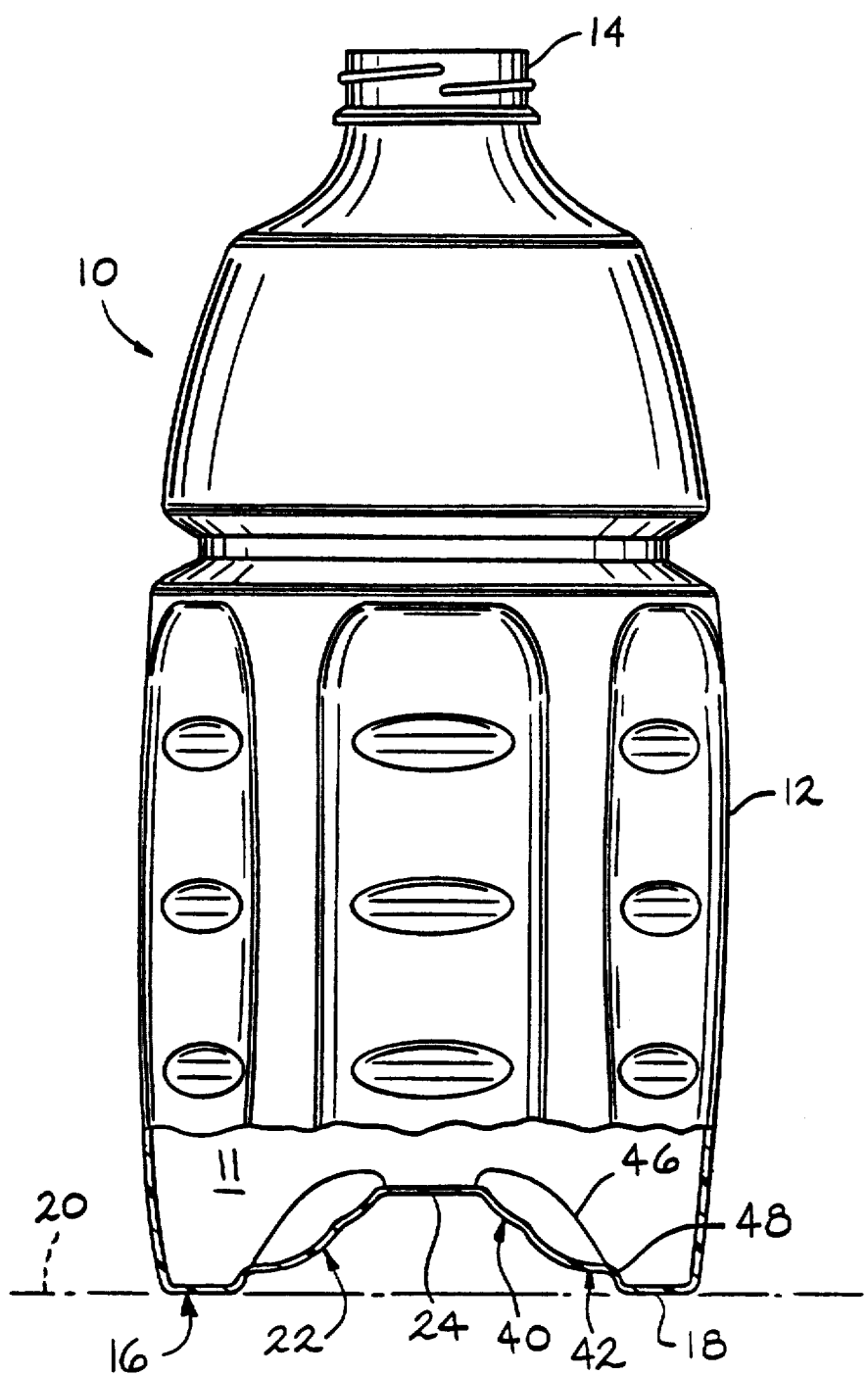
FIG. 1 is a side elevational view of the container having a base structure in accordance with the present invention, with the bottom portion of the container broken away and shown in curved section.

With reference to the drawing, FIG. 1 illustrates an example of a container made from PET which is generally designated at 10. The container 10 generally includes a sidewall 12, an upper closure mouth 14, and a base 16. The sidewall 12 can be formed into a multitude of different configurations in order to provide the desired aesthetic intent, product identification and structural characteristics. The mouth 14 is adapted to receive a threaded closure cap (not shown) and is a rigid ring which can withstand the mechanical loads imposed by such a cap. The base 16 includes a peripheral ring 18, which defines a support plane 20, and a generally concave dome 22 extending upwardly into the body cavity 11 of the container 10 and terminating in a centrally located disk 24. The dome 22 surface may be spherical, parabolic, conical, tapered or similarly contoured. The configuration of the base 16 which incorporates the features of the present invention will be described in greater detail below.

During fabrication of the container 10, a preform 26, having a shape similar to a laboratory test tube, is positioned inside of a blow mold 28. The blow mold 28 is comprised of a right mold half 30, a left mold half 32 and a mold bottom 34. After insertion into the mold 28, the preform 26 is heated and a plunger 36 is used to axially elongate the preform. While being axially stretched, the preform 26 is also expanded through differential pressure provided via a port 38 in the plunger 36. The preform 26 is expanded until conforming to the inner surface of the mold 28. During this expansion, the container 10 undergoes a combination of both axial and radial elongation. As previously mentioned, an insufficient elongation will give rise to retractive stresses in the final product.

The retractive stresses become increasingly significant as one progresses outwardly into a transition region 40, located between the center disk 24 and a uniformly oriented portion 42 adjacent the peripheral ring 18. The material of the transition region 40 begins to undergo increased elongation, relative to the center disk 24. However, the PET of this transition region 40 is insufficiently stretched and oriented and therefore particularly susceptible to the random and asymmetrical buckling induced by various thermal and mechanical stresses.

The mold halves 30 and 32 are provided with coolant passages 44 to control the temperature of the mold 28 itself. Providing different temperatures within the mold 28 enables different material characteristics to be produced in designated areas of the container 10. The use of this type of mold is described in U.S. Pat. Nos. 4,497,855 and 4,318,882, and are hereby incorporated by reference. The abovementioned patents describe a container which is molded into a first configuration and then remolded into an increased volume second configuration which allows the container to return to its original configuration, in response to the PET's "memory", as a hot-filled liquid contracts during cooling. A container 10 in accordance with this invention may also be formed using the technology disclosed in those patents.

The base portion 16 according to this invention is best described with reference to FIGS. 3, 4 and 5. The center of the concave dome 22 is defined by a thick center disk 24, as mentioned previously. A number of reinforcing spiral ribs 46, originating about the central disk 24, radiate outward along the dome 22 in an involute or spiral path. The tangent vector to any point along the spiral path would thus be changing in three directions and the path would represent a continuously varying three dimensional path. When projected onto a planar surface, the curvature of the ribs 46 could be represented mathematically by various curves, including, but not limited to, an involute, an Archimedean spiral, a parabolic spiral, or a logarithmic spiral. An Archimedean spiral may be defined as the plane curve generated by a point moving toward or away from a fixed point at a constant rate while the radius vector from the fixed point rotates at a constant rate.

The present embodiment displays eight ribs because this number provides for a spacing of the ribs 46 in which the space between adjacent ribs 46 approximates the width of a rib so that the base structure dome 22 is substantially totally filled with an array of ribs 46. A greater or lesser number of ribs may be employed so long as they fill the dome 22. Each rib 46 arcs about the central disk 24, at an increasing distance therefrom and generally downward along the dome 22 until fading out and terminating at an annular, and generally upright, reinforcing rim 48. The annular rim 48 defines an area connecting the peripheral ring 18 to the dome 22. Rounded inwardly, the outer sidewall 12 of the container 10 defines the exterior edge of the peripheral ring 18 and base 16.

As shown in FIG. 4, each rib 46 has a cross-sectional shape corresponding to a general horseshoe configuration 50. The horseshoe 50 is positioned so that the closed bend 52 is positioned and raised upwardly into the body cavity 11 of the container 10. Thus, each rib 46 is also raised into the body cavity 11. Each rib 46 avoids the introduction of sharp corners in order to prevent the development of further stress concentrations.

Between each adjacent rib 46 extends a spiral slide portion 54. Each slide 54, like each rib 46, originates at the central disk 24 and radiates outward and downward along a three dimensional curve until also terminating at the annular rim 48 adjacent to the peripheral ring 18. Again, when projected onto a planar surface, the curvature of the slides 54 could be mathematically represented by various curves, including an involute, an Archimedean spiral, parabolic spiral or logarithmic spiral.

The spiral configuration of the base portion 16 provides a number of benefits. The horseshoe 50 cross-sectional shape of the spiral ribs 46 provides structural rigidity and reinforcement throughout the base 16 against both the dimensional changes caused by unrelaxed retractive stresses when the PET is at an elevated temperature and dimensional changes caused by increased internal pressure. While needed reinforcement is provided in the transition region 40, the spiral ribs 46 also continue into the uniformly oriented outer portion 42 to provide structural support. This spiraling nature of the present invention significantly enables the overall area of the transition region 40 to be reduced while further increasing the overall area of uniformly oriented PET 42 in the base 16.

In present blow molded containers, a region of the preform, which becomes the base, is stretched axially and radially from the center disk downward along the dome created by the bottom mold. When blow molded in this fashion, the amount of stretch capable of biaxially orienting the PET is limited. In the present invention, as the heated preform 26 is blown into conformity with the mold bottom 34, the PET is caused to stretch along the curves of both the spiral ribs and slides. The curve of the spirals permit a greater amount of the PET forming the dome 22 of the base 16 to become sufficiently stretched and uniformly oriented. Thus, the unrelaxed retractive stresses within the base 16 of the container 10 are controlled, when the container 10 is subjected to the elevated temperatures of the demolding and hot-fill processes, by both the spiral ribs 46 and the spiral slides 52.

The present invention varies from the blow molding technology of today in that a number of undeformed and insufficiently stretched radial sections are not required as load bearing members in the base 16. In the present invention, the spiral ribs 46 and slides 54 both induce a greater amount of stretch. Additionally, the spiral ribs 46 also provide the needed load bearing capacity. The horseshoe shape 50 of the ribs 4 provide structural reinforcement throughout the base 16, and particularly around the central disk 24, to withstand internal pressure increases within the container 10 resulting from handling or sudden impact. As a result, the overall amount of insufficiently oriented PET material is reduced without sacrificing structural rigidity in the base 16.

While the above invention constitutes the preferred embodiment of the present invention, it will be appreciated that the invention is susceptible to modification, variation and change without departing from the proper scope and fair meaning of the accompanying claims.

I claim:

1. A PET container formed by blow molding and adapted to be filled with liquid at a temperature elevated above room temperature, said container comprising an upper portion defining a sealable closure, a sidewall portion, and
    a base structure closing the bottom of the container and formed integral with said sidewall portion, said base structure having a peripheral support ring at the lower end of said sidewall portion that is substantially concentric with said sidewall portion, a dome formed integral with said peripheral ring and extending upwardly into said container and terminating in a central disk portion that is also substantially concentric with said sidewall portion, said dome including an annular wall extending between said disk portion and said peripheral ring, at least a portion of said annular wall being subject to deformation by virtue of the presence therein of unrelaxed retractive stresses resulting from blow molding and the heating effect of filling said container with liquid at an elevated temperature, said annular wall being shaped to resist said stresses by the provision of a transversely spaced plurality of rib members therein spanning and extending across said annular wall, each said rib member having upright reinforcing walls with connecting portions therebetween and extend in a direction radiating substantially outwardly and downwardly along an involute path from said disk portion increasing in distance therefrom and being of substantially spiral shape to thereby reinforce the ability of said annular wall to resist deformation during the filling of said container with a liquid at said elevated temperature.

2. The container according to claim 1 wherein said annular wall includes an upright reinforcing rim at the outer edge thereof joining said annular wall to said peripheral ring.

3. A container according to claim 1 wherein said rib members are arranged in a substantially evenly spaced circumferential relation on said annular wall.

4. A container according to claim 1 wherein said rib members resist said stresses in said dome by reducing the area of said dome in which said stresses can form.

* * * * *

Disclaimer 4,993,566.—*Theodore F. Eberle*, Saline. Mich. SPIRAL CONTAINER BASE STRUCTURE FOR HOT FILL PET CONTAINER. Patent dated Feb. 19, 1991. Disclaimer filed Feb. 2, 1990, by the assignee, Hoover Universal Inc.

The term of this patent subsequent to Feb. 19, 2008, has been disclaimed.
[ *Official Gazette May 14, 1991* ]